Sept. 30, 1969  D. G. HARDING  3,469,644
WEIGHT INDICATING MECHANISM
Filed Feb. 29, 1968
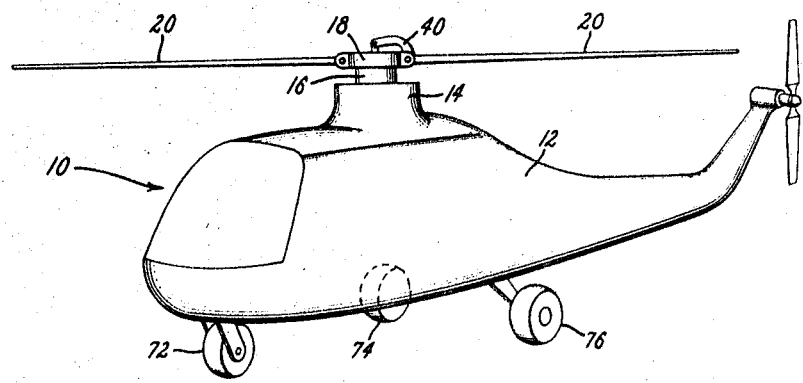
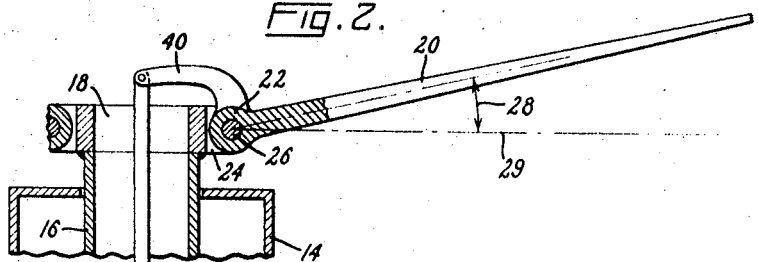
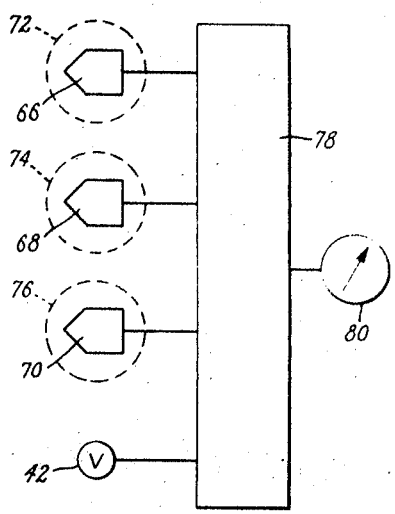
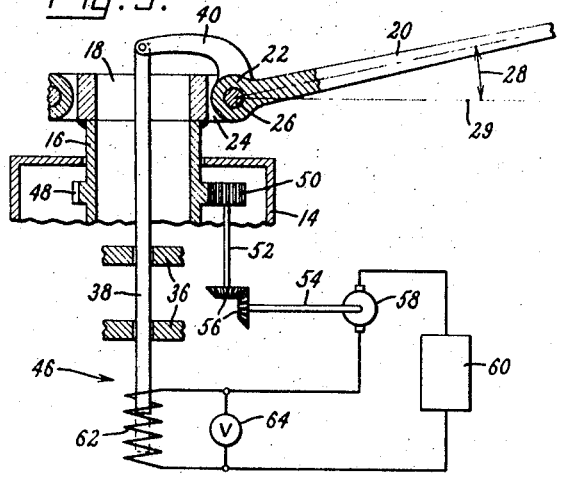
INVENTOR:
David G. Harding,
BY *Albert W. Hilburger*
ATTORNEY

United States Patent Office 3,469,644
Patented Sept. 30, 1969

3,469,644
WEIGHT INDICATING MECHANISM
David G. Harding, Brookhaven, Pa., assignor to The Boeing Company, Seattle, Wash., a corporation of Delaware
Filed Feb. 29, 1968, Ser. No. 709,401
Int. Cl. G01g 19/08
U.S. Cl. 177—136                                   19 Claims

ABSTRACT OF THE DISCLOSURE

Apparatus for measuring the weight of a vertical lift aircraft. Signals representing the rotational speed and the position of a rotor blade about a flapping axis are measured and summed to determine the thrust imparted by the rotor blade to the aircraft and therefore the weight of the aircraft. The measured weight is appropriately modified in the event the aircraft is ascending, descending, or resting on a supporting surface.

---

This invention relates generally to vertical lift aircraft and specifically to apparatus for measuring the weight of a vertical lift aircraft.

In order for an aircraft to achieve optimum performance accompanied with a reasonable factor of safety, it is important for the pilot to be informed of the weight of the aircraft at the outset of the flight and he would be further aided to a considerable degree if he were provided a continuous reading of aircraft weight throughout the course of the flight.

In the past, it was necessary to keep an accurate account of cargo, fuel and other payload, but as the fuel because depleted and was replaced and cargo was unloaded and reloaded, it became difficult and time consuming to maintain accurate records indicating the weight of the aircraft. To avoid these difficulties, weight indicators based on the measurement of landing gear loads have been developed for conventional aircraft. Although such weight indicators have generally performed their intended purpose, they have not been entirely successful when employed on vertical lift aircraft, such as a helicopter. This lack of success results from the nature of the helicopter itself and from its operating procedures which differ somewhat from those employed for conventional aircraft.

Specifically, although a helicopter may be initially loaded when its rotor blades are in a stationary condition, subsequent loading and unloading of the helicopter in the course of its continued operation are usually performed while the rotor blades remain rotating. This procedure provides for optimum economy and for rapid turnaround capability. That is, with the rotor blades continuing to rotate during unloading and reloading operations, it is unnecessary to brake the blades to a halt and subsequently return them to speed. Furthermore, in this manner, the helicopter is enabled to spend the majority of its operating time in the air.

That readings from conventional weight indicators installed on helicopters, are often inaccurate can be ascribed to the fact that rotor blades in a rotating condition, even though feathered, create a residual thrust which imparts lift to the aircraft. Air currents in the vicinity of the aircraft also act upon the rotor blades thereby affecting the resultant value of the residual thrust and therefore the lift imparted to the aircraft.

Accordingly, the invention provides apparatus which is especially compatible with the nature of a vertical lift aircraft for measuring its weight. To this end, signals representing the rotational speed and the position of a rotor blade about a flapping axis are measured and multiplied to determine the thrust imparted by the rotor blade to the aircraft and therefore the weight of the aircraft. The measured value of the weight is appropriately modified in the event the aircraft is ascending, descending, or resting on a supporting surface. The invention is characterized by its simplicity of construction and operation, and by the absence of such devices as slip rings and the like for transferring an electrical signal from rotating parts to stationary structure of the aircraft.

Accordingly, it is a primary object of the invention to provide new and improved apparatus for measuring the weight of an aircraft.

Another object of the invention is the provision of new and improved apparatus for measuring the weight of a vertical lift aircraft such as a helicopter.

Still another object of the invention is the provision of new and improved weight measuring apparatus for a helicopter including a sensing mechanism responsive to the position of the rotor blades about a flapping axis and thereby determining the thrust imparted by the rotor blades to the helicopter. A related object is to provide such an aircraft in which the sensing mechanism includes a member connected to the rotor blade and movable with the blade during its flapping movement and a transducer responsive to the position of the member for determining the thrust imparted by the rotor blade to the helicopter.

Yet another object of the invention is the provision of weight measuring apparatus for a helicopter including a sensing mechanism responsive both to the rotational speed of the rotor blades and to the position of the rotor blades about their flapping axis and thereby determining the thrust imparted by the rotor blades to the helicopter.

Still a further object of the invention is to provide weight measuring apparatus for a helicopter which is responsive to the rotational speed of the rotor blade and to the position of the rotor blades about their flapping axes for determining the thrust imparted by the rotor blades to the helicopter and further being responsive to whether aircraft is ascending, descending, or resting on a supporting surface for improving the accuracy of the thrust determination.

Other and further objects and advantages of the invention are apparent or will be presented in the description which follows when taken together with the accompanying drawings.

In the drawings:

FIGURE 1 is a perspective view of a helicopter embodying the present invention;

FIGURE 2 is a detailed side elevation view, partially cut away and in section, schematically illustrating one embodiment of the invention.

FIGURE 3 is a detailed view similar to FIGURE 2, but illustrating another embodiment of the invention; and FIGURE 4 is a schematic diagram illustrating an overall system for measuring the weight of a helicopter.

Refer to the drawings and initially to FIGURE 1 in which a vertical lift aircraft represented as a helicopter 10 includes a fuselage 12 provided with a rotor mast 14. Turning to FIGURE 2, a hollow rotor shaft 16 is suitably mounted on the fuselage 12 for rotation and extends through and beyond the rotor mast 14. Fixed to an upper end of the rotor shaft 16 is a hub 18 adapted to support rotor blades 20 at their innermost ends. Specifically, each blade 20 is hinged to the hub 18 in that a root end 22 of the blade 20 is connected to a lug 24 integral with the hub 18 by means of a pin 26 so that the blade 20 can pivot or flap about the pin 26

When the helicopter 10 is in a hover condition, the thrust produced by the rotor blade 20 is substantially equal to the weight of the helicopter 10. Each blade 20 supports a proportionate share of the weight of the helicopter 10 and, being free to pivot or flap about the pin 26, assumes an angular relationship defined by a coning angle 28 between a pitch axis of the blade and a plane 29 perpendicular to its axis of rotation. The thrust produced by the rotor blades 20, and therefore the weight of the helicopter 10, is a function of the blade coning angle 28 and the square of the rotational speed of the rotor blades 20.

Thus, a sensing mechanism 30 (FIGURE 2) is operable to provide signals representing values of the blade coning angle 28 and the square of the rotational speed of the rotor blades 20 and by suitably multiplying these values arrive at a single value representing the gross weight of the helicopter in hover. Since the rotational speed of the rotor shaft 16 and of the rotor blades 20 of a turbine-powered helicopter remains substantially constant, the sensing mechanism may assume a constant speed operation and be responsive only to changes in the coning angle 28. Such a mechanism may take the form of any suitable variable voltage, constant current alternating current source 32 of electromotive force to create a magnetic field in the region of a multiple turn coil or transducer 34 connected to the source 32.

Appropriately spaced guides 36 serve to align a control rod 38 so as to be substantially concentric with the coil 34. An upper end of the control rod 38 is pivotally connected to a flap arm 40 integral with the root end 22 of one of the blades 20. Thus, as the blade 20 pivots about the pin 26 thereby changing the coning angle 28, the control rod 38 is caused to move in a substantiallly longitudinal direction as determined by the guides 36. At least a lower end of the control rod 38 is composed of a ferromagnetic material such as soft iron whereby insertion of the control rod 38 into the coil 34 is effective to increase the magnitude of the magnetic field surrounding the coil, and withdrawal of the control rod 38 from the coil 34 serves to reduce the magnitude of the magnetic field. A voltmeter 42 serves to indicate the potential of the resultant flow of electric current in the coil 34 and may be suitably calibrated to indicate the thrust imparted by the rotor blades 20 to the helicopter 10. In the event the helicoper 10 is ascending or descending thereby introducing additional forces acting on helicopter, it would be desirable to add to the electrical circuit including the source 32 and the coil 34, a gravity sensitive amplifier 44 having a gain proportional to acceleration of the helicopter in a vertical direction.

A slightly different embodiment of the invention is schematically illustrated in FIGURE 3 and operates to provide compensation for relatively large variations in the speed of the rotor shaft 16. Specifically, a sensing mechanism 46 includes a spur gear 48 fixed to the shaft 16 and engaged with a pinion 50 to drive through suitable mechanical connections, including shafts 52 and 54 and bevel gears 56, a suitable variable voltage, constant current, alternating current source 58 of electromotive force. By employing an electronic squaring device 60 such as a quarter-square multiplier, an electric potential is created across a coil 62 which is proportional to the square of the rotational speed of the rotor blades 20. As in the previous embodiment, the position of the control rod 38 relative to the coil 62 is a function of the coning angle 28 of the rotor blade 20 such that the control rod is effective to modify the magnitude of the magnetic field surrounding its coil in response to the position of the control rod relative to the coil. Thus, a voltmeter 64 is provided to measure the resulting electric potential across the coil 62, which potential has a value proportional to the rotational speed of the rotor blades 20 and to the coning angle 28 of each. As in the previous embodiment, the voltmeter 64 is suitably calibrated so as to indicate the weight of the helicopter 10.

Turn now to FIGURE 4 which provides for a complete weight measuring system for the helicopter 10. Weight indicating devices 66, 68, and 70 such as those disclosed in the commonly assigned, co-pending application to David G. Harding entitled "Weight Indicator," Serial Number 709,402, filed February 29, 1968 are preferably installed, respectively, in each of the helicopter's landing gear units 72, 74, and 76. Outputs from each of the three devices 66, 68, and 70 occurring when the helicopter 10 is at least partially resting on a supporting surface are integrated with an output from the voltmeter 42 (FIGURE 2) in a suitable summing amplifier 78. It will be appreciated that while the weight indicating devices 66, 68, and 70 provide an accurate measurement of the weight of the helicopter 10 when the rotor blades 20 are stationary, the residual thrust imparted to the helicopter when the blades 20 are rotating, may be substantial and thereby cause an inaccurate weight measurement. It is for this reason that the output recorded by the voltmeter 42 is added to the outputs from the weight indicating devices 66, 68, and 70 to provide a corrected weight measurement whose value is registered by a suitable meter device 80.

What is claimed is:

1. Apparatus for measuring the weight of a vertical lift aircraft comprising:
    a body,
    a rotor blade mounted on said body for rotation and for flapping movement about a substantially horizontal axis, and
    sensing means substantially responsive to the position of said rotor blade about said axis relative to said body for determining the thrust imparted by said rotor blade to said body.

2. Apparatus as set forth in claim 1 wherein said sensing means includes a member connected to said rotor blade and movable therewith during said flapping movement and a transducer including means responsive to the position of said member for determining the thrust imparted by said rotor blade to said body.

3. Apparatus as set forth in claim 2 wherein said transducer is stationary and said member includes a control rod pivotally connected to said rotor blade and mounted for longitudinal movement and for rotation about a longitudinal axis.

4. Apparatus as set forth in claim 3 wherein said rod includes a ferromagnetic portion and wherein said position responsive means includes means for producing a magnetic field, said ferromagnetic portion being movable into said magnetic field and effective to alter the magnitude of said magnetic field in response to flapping movement of said rotor blade and to an extent proportional to the magnitude of said flapping movement, and indicating means sensitive to the magnitude of said magnetic field for measuring the thrust imparted by said rotor blade to said body.

5. Apparatus as set forth in claim 4 wherein said producing means includes a coil generally concentric with said rod, a source of electromotive force for energizing said coil to create said magnetic field, said indicating means being sensitive to the resultant electric potental across said coil for measuring the thrust imparted by said rotor blade to said body.

6. Apparatus as set forth in claim 5 wherein said indicating means includes a voltmeter.

7. Apparatus as set forth in claim 5 wherein said body includes support means and means for registering an output potential proportional to the vertical load of the aircraft on said support means when the aircraft is substantially resting on a supporting surface, and means for summing said potential in said coil with said output from said registering means and thereby measuring the weight of the aircraft.

8. Apparatus as set forth in claim 1 wherein said body includes a fuselage, a hollow rotor shaft rotatably mounted on said fuselage, a hub fixed to said rotor shaft, and wherein said sensing means includes a rod extending through said rotor shaft and having a ferromagnetic portion, said rod being pivotally connected to said rotor blade and mounted for longitudinal movement and for rotation about a longitudinal axis, a coil generally concentric with said rod, a source of electromotive force for energizing said coil to create a magnetic field, said ferromagnetic portion being movable through said magnetic field in response to flapping movement of said rotor blade, and indicating means being sensitive to the potential of the resultant flow of electric current in said coil for measuring the thrust imparted by said rotor blade to said fuselage.

9. Apparatus as set forth in claim 8 wherein said fuselage includes support means and means for registering an output potential proportional to the vertical load of the aircraft on said support means when the aircraft is resting on a supporting surface, and means for summing said potential in said coil with said output from said registering means and thereby measuring the weight of the aircraft.

10. Apparatus as set forth in claim 8 wherein said fuselage includes a plurality of landing gear units and means for registering an output potential proportional to the vertical load of the aircraft on said units when the aircraft is resting on a supporting surface, and means for summing said potential in said coil with said output from said registering means and thereby measuring the weight of the aircraft.

11. Apparatus as set forth in claim 2 wherein said sensing means includes means responsive to rotational speed of said rotor blade, said positioning responsive means including means for producing a magnetic field proportional to rotational speed of said rotor blade, whereby thrust imparted by said rotor blade to said body is determined as a function of rotational speed of said rotor blade and of said position of said rotor blade.

12. Apparatus as set forth in claim 11 wherein said transducer is stationary and said member includes a rod pivotally connected to said rotor blade and mounted for longitudinal movement and for rotation about a longitudinal axis.

13. Apparatus as set forth in claim 12 wherein said rod includes a ferromagnetic portion movable into said magnetic field and effective to alter the magnitude in response to flapping movement of said rotor blade and to an extent proportional to the magnitude of said flapping movement, and including indicating means sensitive to the magnitude of said magnetic field for measuring the thrust imparted by said rotor blade to said body.

14. Apparatus as set forth in claim 13 wherein said producing means includes a coil generally concentric with said rod, a source of electromotive force for energizing said coil to create said magnetic field, said indicating means being sensitive to the resultant electric potential across said coil for measuring the thrust imparted by said rotor blade to said body.

15. Apparatus as set forth in claim 14 wherein said indicating means includes a voltmeter.

16. Apparatus as set forth in claim 14 wherein said body includes support means and means for registering an output potential proportional to the vertical load of the aircraft on said support means when the aircraft is substantially resting on a supporting surface, and means for summing said potential in said coil with said output from said registering means and thereby measuring the weight of the aircraft.

17. Apparatus as set forth in claim 1 wherein said body includes a fuselage, a hollow rotor shaft rotatably mounted on said fuselage, a hub fixed to said rotor shaft, and said sensing means includes a rod extending through said rotor shaft and having a ferromagnetic portion, said rod being pivotally connected to said rotor blade and mounted for longitudinal movement and for rotation about a longitudinal axis, a coil generally concentric with said rod, a source of electromotive force for energizing said coil to create a magnetic field proportional to rotational speed of said rotor blade, said ferromagnetic portion being movable through said magnetic field in response to flapping movement of said rotor blade, and indicating means being sensitive to the resultant electric potential across said coil for measuring the thrust imparted by said rotor blade to said fuselage.

18. Apparatus as set forth in claim 17 wherein said fuselage includes support means and means for registering an output potential proportional to the vertical load of the aircraft on said support means when the aircraft is resting on a supporting surface, and means for summing said potential in said coil with said output from said registering means and thereby measuring the weight of the aircraft.

19. Apparatus as set forth in claim 17 wherein said fuselage includes a plurality of landing gear units and means for registering an output potential proportional to the vertical load of the aircraft on said units when the aircraft is resting on a supporting surface, and means for summing said potential in said coil with said output from said registering means and thereby measuring the weight of the aircraft.

References Cited

UNITED STATES PATENTS

| | | |
|---|---|---|
| 2,605,093 | 7/1952 | Dorand. |
| 2,702,169 | 2/1955 | Cannon et al. __ 170—160.22 X |
| 2,702,170 | 2/1955 | Linnaberry _____ 170—160.22 |
| 2,806,402 | 9/1957 | Ferris. |

RICHARD B. WILKINSON, Primary Examiner

GEORGE H. MILLER, JR., Assistant Examiner

U.S. Cl. X.R.

73—117.4; 170—160.22; 177—210